(No Model.)
G. T. PLUMB.
CARCASS SPREADER.
No. 473,127. Patented Apr. 19, 1892.
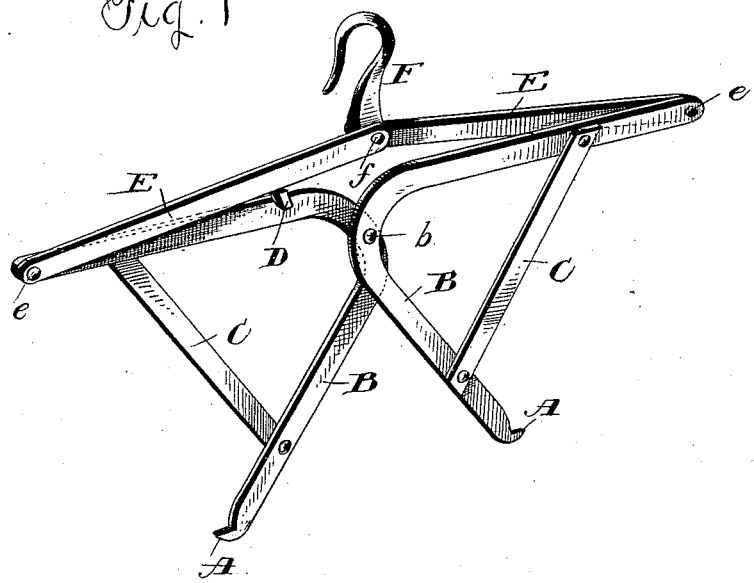
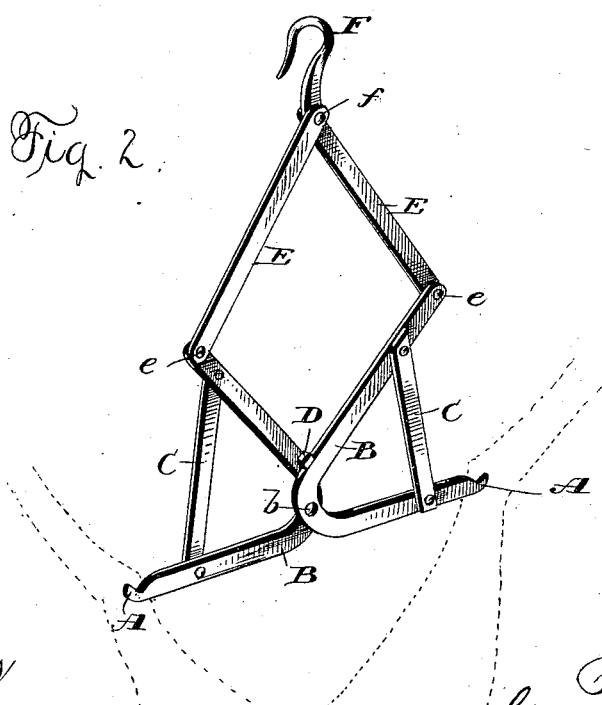
Witnesses
C. J. Williamson.
A. L. Hough.
Inventor
George T. Plumb,
by Franklin H. Hough
his Attorney

UNITED STATES PATENT OFFICE.

GEORGE T. PLUMB, OF DANBURY, NEBRASKA.

CARCASS-SPREADER.

SPECIFICATION forming part of Letters Patent No. 473,127, dated April 19, 1892.

Application filed December 28, 1891. Serial No. 416,307. (No model.)

*To all whom it may concern:*

Be it known that I, GEORGE T. PLUMB, a citizen of the United States, residing at Danbury, in the county of Red Willow and State of Nebraska, have invented certain new and useful Improvements in Carcass-Spreaders; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in appliances for use in spreading carcasses to aid butchers in removing the entrails and in dressing of beef, hogs, &c., by which improvement I provide means for automatically spreading the carcass by the weight of the animal itself when hoisted to a perpendicular position.

A further object of my invention is to provide an instrument of the character described which shall be simple in construction and easy of manipulation, and at the same time, being durable and owing to its simplicity, can be made at the lowest minimum price.

To these ends and to such others as the invention relates the same consists in the novel combination, arrangement, and adaptation of the parts, as hereinafter more fully described, and then specifically defined in the appended claim.

The invention is clearly illustrated in the accompanying drawings, which, with the letters of reference marked thereon, form a part of this specification, like letters of reference indicating like parts throughout the several views, in which—

Figure 1 is a perspective view of my invention closed, or in the position the instrument is when the gambrel-hooks are being attached to the carcass. Fig. 2 shows the spreader with the levers containing the hooks thrown to their outmost lateral extent, the carcass being shown in dotted lines.

Reference now being had to the details of the drawings, A represents the gambrel-hooks, which are formed integral with the V-shaped levers by merely turning the ends upward into a hook.

B are the tilted V-shaped levers, pivoted together at $b$, and C C are braces, which strengthen the arms of the V-shaped levers.

D is a lug attached to one of the arms of the V-shaped levers near its pivotal point, and serves as a stop against which the corresponding arm of the second V-shaped lever comes in contact, thus bringing the two gambrel-hook arms in a horizontal line and holding the arms from further elevation.

E E are levers pivoted to the upper arms of the V-shaped levers, as at $e\ e$, and the other ends being pivoted, together with the elevating-hook F, at $f$.

The operation of my invention will be readily understood. The gambrel-hooks are attached to the legs of the animal when the instrument is in a closed position, and then by the application of power to the elevating-hook the arms of the levers containing the gambrel-hooks are gradually spread to their farthest lateral throw by the weight of the carcass, and when the said arms have come into a horizontal line the animal to be dressed is hoisted to a perpendicular position.

Having thus described my invention, what I claim to be new, and desire to secure by Letters Patent, is—

In a device for spreading carcasses, the combination of the two V-shaped levers pivoted together at their apexes, the free ends of the said lever having gambrel-hooks, a lug D to hold the hooks in a horizontal line, and the levers E E, pivoted to said V-shaped levers at their lower ends and their upper ends pivoted, together with the elevating-hook, all substantially as shown and described.

In testimony whereof I affix my signature in presence of two witnesses.

GEORGE T. PLUMB.

Witnesses:
S. W. McKEE,
S. H. STILGEBONER.